(12) United States Patent
Case et al.

(10) Patent No.: US 8,100,218 B2
(45) Date of Patent: Jan. 24, 2012

(54) ELECTRONIC THROTTLE ON CONTROL HANDLE

(75) Inventors: Michael D. Case, Elmwood, IL (US); Joseph M. Biggerstaff, Wichita, KS (US); William Ryan Haar, Wichita, KS (US); Tim Newlin, Wichita, KS (US); Eric Potter, Valley Center, KS (US)

(73) Assignee: CNH America LLC

( * ) Notice: Subject to any disclaimer, the term of this patent is extended or adjusted under 35 U.S.C. 154(b) by 180 days.

(21) Appl. No.: 12/581,616

(22) Filed: Oct. 19, 2009

(65) Prior Publication Data

US 2011/0088961 A1 Apr. 21, 2011

(51) Int. Cl. B60K 26/00 (2006.01)

(52) U.S. Cl. ........ 180/333; 180/315; 180/335; 180/336; 74/471 XY

(58) Field of Classification Search .................. 180/315, 180/331, 333, 335, 336; 187/224; 74/471 XY
See application file for complete search history.

(56) References Cited

U.S. PATENT DOCUMENTS

| | | | |
|---|---|---|---|
| 3,022,850 A * | 2/1962 | Bidwell et al. ................. 180/333 |
| 3,867,600 A | 2/1975 | Phillips |
| 5,042,314 A | 8/1991 | Rytter et al. |
| 5,315,900 A * | 5/1994 | Teeter ............................ 477/165 |
| 5,365,803 A * | 11/1994 | Kelley et al. ................. 74/484 R |
| 5,566,586 A | 10/1996 | Lauer et al. |
| 5,845,735 A * | 12/1998 | Muller et al. ................. 180/322 |
| 5,938,282 A * | 8/1999 | Epple ........................... 297/217.3 |
| 5,957,001 A * | 9/1999 | Gualtieri et al. ............ 74/473.12 |
| 6,006,852 A | 12/1999 | Eckstein et al. |
| 6,152,239 A | 11/2000 | Kelley et al. |
| 6,177,640 B1 | 1/2001 | Okabe et al. |
| 6,285,093 B1 * | 9/2001 | Scheer ........................... 307/115 |
| 6,624,806 B2 | 9/2003 | Hsu |
| 6,827,174 B2 | 12/2004 | Chernoff et al. |
| 6,880,855 B2 | 4/2005 | Chernoff et al. |
| 6,932,183 B2 | 8/2005 | Jeppe et al. |
| 6,979,278 B2 * | 12/2005 | Rick et al. ......................... 477/98 |
| 7,305,295 B2 * | 12/2007 | Bauerle et al. ................... 701/93 |
| 7,409,879 B2 * | 8/2008 | Glatz ........................ 73/862.541 |
| 7,511,236 B2 * | 3/2009 | Mack .......................... 200/61.54 |
| 7,775,317 B1 * | 8/2010 | Goodwin et al. ............. 180/321 |
| 2002/0074179 A1 * | 6/2002 | Brandt et al. ................. 180/252 |
| 2004/0108161 A1 * | 6/2004 | Ohno ............................ 180/315 |
| 2004/0129486 A1 * | 7/2004 | Chernoff et al. ............. 180/315 |
| 2005/0068295 A1 | 3/2005 | Schottler et al. |
| 2005/0279561 A1 | 12/2005 | Shearer et al. |
| 2006/0007144 A1 | 1/2006 | Mathiasen et al. |
| 2006/0137931 A1 | 6/2006 | Berg et al. |
| 2008/0250889 A1 * | 10/2008 | Mack ....................... 74/471 XY |

* cited by examiner

*Primary Examiner* — Ruth Ilan
(74) *Attorney, Agent, or Firm* — Sue C. Watson

(57) ABSTRACT

A steering and engine speed control mechanism for operating a vehicle. The control mechanism has a control handle mounted on the vehicle. The control handle is configured to deflect about an axis by movement of an operator's hand. A steering direction of the vehicle is related to a deflection angle of the control handle about the axis. An actuating element for changing the speed of the engine of the vehicle is attached to the control handle and is conveniently movable by an operator's digit to a plurality of positions to effect the desired speed of the engine.

12 Claims, 3 Drawing Sheets

ELECTRONIC THROTTLE ON CONTROL HANDLE

FIELD OF THE INVENTION

The present disclosure is directed to a control mechanism for a work vehicle and, more particularly, to a control handle mechanism for a work vehicle.

BACKGROUND OF THE INVENTION

Work vehicles such as, for example, motor graders, backhoe loaders, agricultural tractors, wheel loaders, skid-steer loaders, and other types of heavy vehicles are used for a variety of tasks requiring operator control of the work vehicle and various work implements associated with the work vehicle. These work vehicles and work implements can be relatively complicated and difficult to operate. They may have an operator interface with numerous controls for steering, position, orientation, transmission gear ratio, and travel speed of the work vehicle, as well as position, orientation, depth, width, and angle of the work implement.

Historically, work vehicles have incorporated single-axis lever control mechanisms with complex mechanical linkages and multiple operating joints, or a plurality of cables to provide the desired functionality. Such control mechanisms require operators with high skill levels to control the many input devices. After a period of operating these control mechanisms, the operators may become fatigued. In addition, because the operator's hand may be required to travel from one actuating element to another, an operator's delayed reaction time, as well as the complexity and counter-intuitiveness of the controls, may result in poor quality and/or low production.

An operator interface may include a control handle control mechanism designed to reduce operator fatigue, improve operator response time, and facilitate functionality of the work vehicle. For example, U.S. Pat. No. 5,042,314 (the '314 patent), discloses a steering and engine speed control mechanism that includes a transversely rockable control handle. The steering and engine speed control mechanism also includes a steering actuator element connected at the bottom of the control handle to depress either a left or right actuating plunger of a hydraulic pilot valve assembly for effecting steering. The steering and engine speed control mechanism further includes an electrical switch activating element which is used to select one of the transmission gear speed ratios of a multi-speed transmission through an associated electronic control mechanism.

Although the steering and engine speed control mechanism of the '314 patent may alleviate some of the problems associated with separate work vehicle controls for effecting steering and select transmission operations, the throttle control is still operated via a mechanical hand or foot operation which is separate from the steering and control mechanism described. The operator must take his/her hand off the vehicle control lever in order to adjust the throttle, thereby creating safety and worker fatigue issues during operation of the vehicle.

It would therefore be beneficial to provide a mechanism which is controlled by the hand of the operator and from which the throttle can be controlled to minimize operator fatigue and enhance safety.

SUMMARY OF THE INVENTION

The invention is directed to a steering and engine speed control mechanism for operating a vehicle. The control mechanism has a control handle mounted on the vehicle. The control handle is configured to deflect about an axis by movement of the operator's hand. A steering direction of the vehicle is related to a deflection angle of the control handle about the axis. An actuating element for changing the speed of the engine is attached to the control handle and is conveniently movable by the operator's digit to a plurality of positions to effect the desired engine speed.

The actuating element is electrically connected to a control circuit. The control circuit is also electronically connected to a throttle control device of an engine of the vehicle. In operation, the control circuit receives input from the actuating element and sends appropriate output to the throttle control device to control the speed of the engine.

The invention is also directed to a throttle control mechanism for controlling the speed of an engine of a vehicle. The throttle control mechanism has an actuating element positioned on a hand control of a vehicle, the actuating element being movable by an operator's digit. A control circuit is electrically connected to the actuating element. A throttle control device is positioned proximate the engine and is electrically connected to the control circuit. As the actuating element is moved, a first signal is sent to the control circuit. In response to the first signal, the control circuit generates and sends a second signal to the throttle control device. The second signal controls the throttle control device and thereby controls the speed of the engine of the vehicle.

The invention is also directed to a device for control of a vehicle which is arranged in an operator compartment in proximity to the operator. The device includes a multi-function control handle which has a gripping portion with a plurality of control elements. The control elements are constructed and arranged so that they can reliably be reached with one or two digits of a hand of the operator resting on the gripping portion. The device further includes an actuating element for changing the speed of the engine of the vehicle. The actuating element is conveniently movable by an operator's digit to a plurality of positions to effect the desired engine speed.

Other features and advantages of the present invention will be apparent from the following, more detailed description of the preferred embodiment, taken in conjunction with the accompanying drawings which illustrate, by way of example, the principles of the invention.

DETAILED DESCRIPTION OF THE INVENTION

Figure 1:
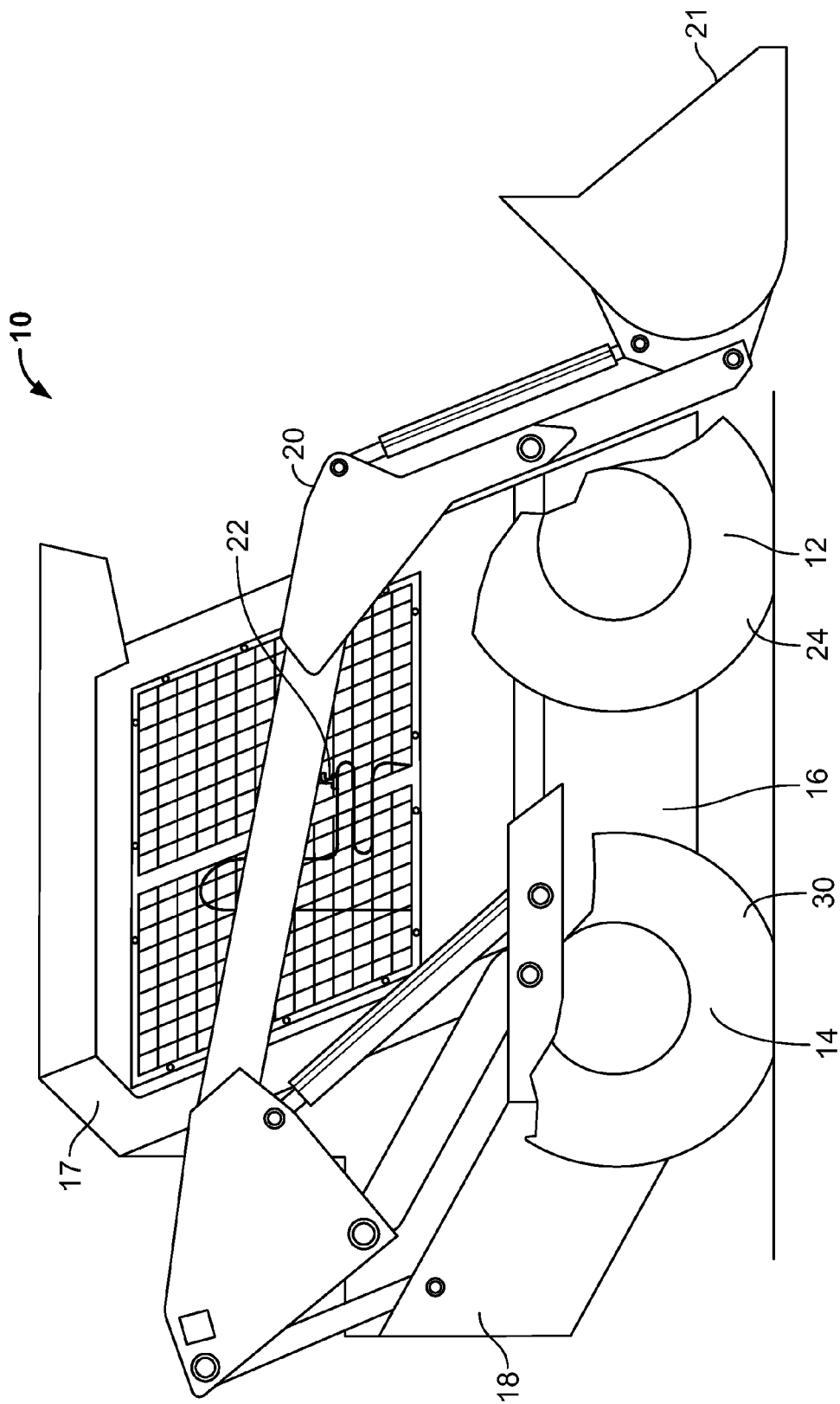
FIG. 1 is a side view of a work vehicle in which a controller is used to operate the work vehicle.

An exemplary embodiment of a work vehicle 10 is illustrated in FIG. 1. Although a skid-steer loader is shown, the work vehicle 10 may be a motor grader, a backhoe loader, an agricultural tractor, a wheel loader, or any other type of work vehicle known in the art. Work vehicle 10 may include a steerable traction device 12, a driven traction device 14, a frame 16 connecting steerable traction device 12 to driven traction device 14, an operator compartment 17 on the frame 16, a power source 18 supported by the driven traction device 14, and a transmission (not shown) configured to transmit power from the power source 18 to the driven traction device 14. The work vehicle 10 may also include a work implement such as, for example, a lift assembly 20 with a bucket 21 attached thereto, and a control mechanism 22.

The steerable traction device 12 may include one or more wheels 24 located on each side of the work vehicle 10 (only one side shown). Alternatively, the steerable traction device 12 may include tracks, belts, or other traction devices. The wheels 24 may be rotatable about a vertical axis 26 for use during steering.

The driven traction device 14 may include wheels 30 located on each side of the work vehicle 10 (only one side shown). Alternatively, the driven traction device 14 may include tracks, belts or other traction devices. The driven traction device 14 may include a differential gear assembly (not shown) configured to divide power from the power source 18 between the wheels 30 located on either side of the work vehicle 10. The differential gear assembly may allow wheels 30 on one side of the work vehicle 10 to rotate at a greater rotational speed than wheels 30 located on an opposite side of the work vehicle 10. (The differential gear assembly may also include a lock feature that will be described in more detail below.) The driven traction device 14 may or may not be steerable. In instances in which power is provided to the steerable traction device 12 in addition to the driven traction device 14, the steerable traction device 12 may also include a differential gear assembly (not shown) configured to divide power from power source 18 between wheels 24 located on either side of the work vehicle 10. The differential gear assembly may allow wheels 24 on one side of the work vehicle 10 to rotate at a greater rotational speed than wheels 24 located on an opposite side of the work vehicle 10.

The power source 18 may be an engine such as, for example, a diesel engine, a gasoline engine, a natural gas engine, or any other engine known in the art. The power source 18 may also be another source of power such as a fuel cell, a power storage device, or another source of power known in the art.

The transmission may be an electric transmission, a hydraulic transmission, a mechanical transmission, or any other transmission known in the art. The transmission may be operable to produce multiple output speed ratios and may be configured to transfer power from the power source 18 to the driven traction device 14 and the steerable traction device 12 at a range of output speeds.

Figure 2A:
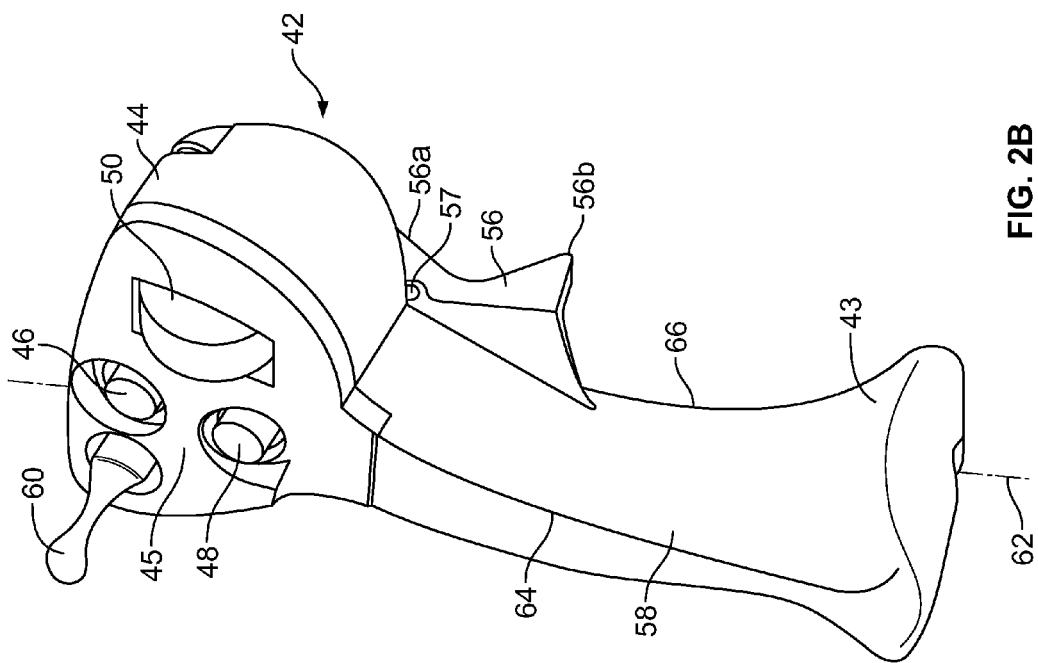
FIG. 2a is a perspective view of the controller with an actuating element.

As illustrated in FIG. 2a, the control mechanism 22 includes a multi-function control handle 42 located in an operator station and mounted on the vehicle for pivotal movement relative thereto, as will be more fully described. The control handle 42 may be configured to position and/or orient the work vehicle 10 and components of the lift assembly 20. The control handle 42 may also be used to actuate various other functions and/or features of the work vehicle 10. While the control handle 42 shown and described is a single control handle, other types of mechanisms may be used. In addition, the control mechanism 22 may have multiple control handles, including, but not limited to, a left control handle and a right control handle located on either side of the operator station.

FIG. 2a illustrates the control handle 42 having a plurality of buttons 46, 48, 49, a throttle control switch or actuating element 50, and a trigger 56 disposed on a lever 58. Various functions of the work vehicle 10 and the lift assembly 20 may be actuated in different manners according to the condition and/or position of the buttons 46, 48, 49, the position of the actuating element 50 and the position of the trigger 56, and the position and orientation of the lever 58. In the embodiment shown, the control handle 42 has a lower grip portion 43 and an upper portion 44 defining an upper surface 45 generally facing an operator. The actuating element 50 is mounted on the upper portion 44 of the control handle 42 and extends above the upper surface 45. Other configurations of the control handle may be used without departing from the scope of the invention.

For example, buttons 46 and 48 may be used to cause the transmission output speed ratio to change. Button 46 may cause the transmission to shift to a higher output speed ratio, and button 48 may cause the transmission to shift to a lower output speed ratio. Transmission ratio shifting buttons 46 and 48 may be recessed within the lever 58.

Figure 3:
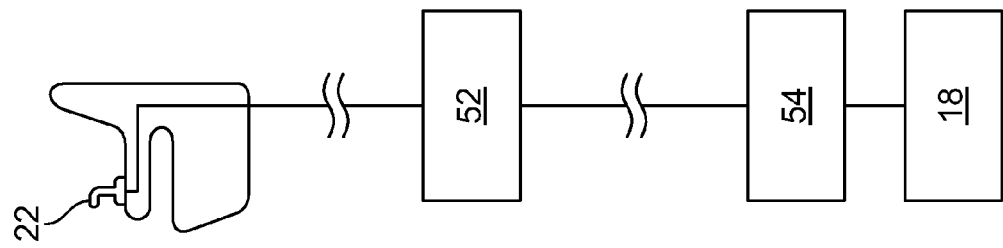
FIG. 3 is a diagrammatic view of the electronic control mechanism.

The actuating element 50 is electrically connected to a control circuit 52 (FIG. 3). The control circuit 52 is electrically connected to a throttle control device 54 located proximate the power source 18. The throttle control device 54 can be any known device which receives an electronic signal and converts the electronic signal to the mechanical control of the throttle. The actuating element 50, the control circuit 52 and the throttle control device 54 may be hard wired or may be send signals through a wireless network such as CAN (Controller Area Network). The actuating element 50, the control circuit 52 and the throttle control device 54 combine to control the speed of the power source or engine. In the embodiment shown, the electronic actuating element 50 is a roller switch, which when rotated upward or away from the operator (as viewed in FIG. 2a) causes the engine speed to increase, and when rotated downward or toward the operator causes the engine speed to decrease. While a roller switch is shown, the actuating element 50 may also be in the form of push buttons, slider switch, potentiometer, or other devices. The actuating element 50, the control circuit 52 and the throttle control device 54 electronically control the fuel/power supply to the engine/power source, thereby eliminating the need for a mechanical linkage. The control circuit 52 can be a circuit board or any other type of programmable circuit.

The magnitude of the rotation of the actuating element 50 relates to the speed of the engine, i.e., the rpm's of the engine. As the upward rotation is continued, the speed of the engine increases. When the rotation is stopped, the engine speed is maintained at that respective level. Likewise, as the downward rotation occurs, the speed of the engine is decreased. The maximum and minimum speed of the engine may be governed by the physical constraints of the actuating element 50. The actuating element 50 may have detents or projections which cooperate with other features, such as projections or surface of the control handle 42 to physically limit the rotation of the actuating element 50. Alternatively, the control circuit 52 (FIG. 3) may limit the maximum and minimum speed of the engine. In such case, as the actuating element 50 is rotated, a signal is sent to the control circuit 52. That is, in one embodiment, the control circuit 52 has predetermined limits (i.e., maximums and minimums) programmed therein. Once the maximum is reached, the continued upward rotation of the actuating element 50 will not cause the control circuit 52 to further increase the speed of the engine. Similarly, once the minimum is reached, the continued downward rotation of the actuating element 50 will not cause the control circuit 52 to further decrease the speed of the engine.

As the actuating element 50 provides input signals to the control circuit 52, the actuating element 50 is not required to directly control significant power and, therefore, the type of standard switches previously recited can be used. As the control circuit 52 sends electronic signals to control the speed of the engine, the need for mechanical linkage is eliminated.

The trigger 56 may be configured to control a transmission condition when actuated. The trigger 56 may be a three-way rocker switch that toggles between forward, neutral, and reverse output directions of the transmission. The trigger 56 may have an upper portion 56a and a lower portion 56b configured to pivot about pivot point 57. When starting in the neutral condition, the reverse condition may be selected by pulling the upper portion 56a a first distance, thereby causing the transmission to operate in a first output rotational direction. Pulling the lower portion 56b the first distance returns the transmission condition to neutral. Pulling the lower portion 56b a second distance selects the forward condition, thereby causing the transmission output rotation to rotate in a second direction opposite the first direction. Pulling the upper portion 56a the second distance returns the transmission condition to neutral.

Figure 2B:
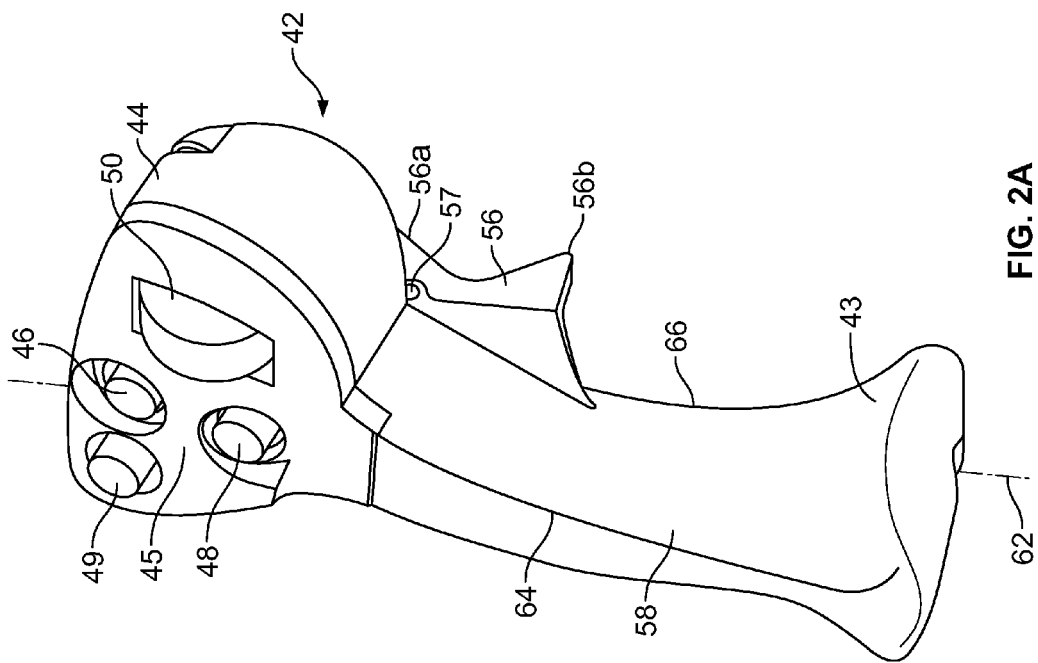
FIG. 2b is a perspective view of an alternate controller with an actuating element.
Figure 2C:
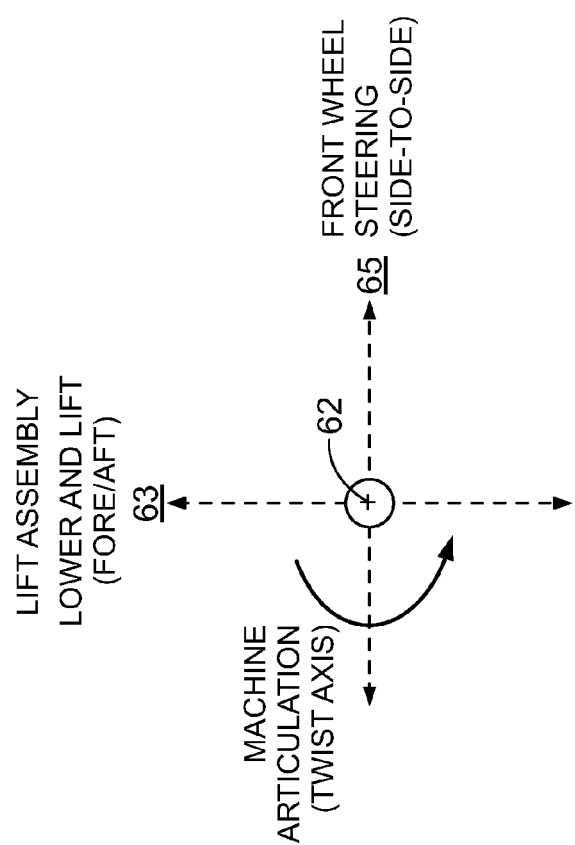
FIG. 2c is a top view schematic illustrating several of the operations of the controllers.

As shown in the top view illustration of FIG. 2c, twisting the lever 58 about a longitudinal axis 62 causes the work vehicle 10 to pivot. A twist of the lever 58 in a clockwise manner causes the work vehicle 10 to pivot in a clockwise direction. Similarly, a twist of the lever 58 in a counter-clockwise manner may cause the work vehicle 10 to pivot in a counter-clockwise direction.

Moving the lever 58 in a vertical direction along the axis 62 may cause the lift assembly 20 to move. Lifting the lever 58 upward along the axis 62 causes the lift assembly 20 to raise, while pushing the lever 58 downward along the axis 62 causes the lift assembly 20 to lower. The speed of the lift assembly 20 may also be controlled by the speed of the engine and therefore by the actuating element 50. That is, in one embodiment, to increase the speed of the lift assembly 20, the actuating element 50 must be engaged to increase the speed of the engine.

Tilting the lever 58 fore and aft about axis 65, may cause the bucket 21 to move. Tilting the lever 58 in a fore direction (away from the operator) about axis 65 causes the bucket 21 to rotate upward, while tilting the lever 58 in an aft direction (toward the operator) about axis 65 causes the bucket 21 to rotate downward. Similar to the lift assembly 20, the speed of the bucket 21 may also be controlled by the speed of the engine and therefore by the actuating element 50. That is, in one embodiment, to increase the speed of the bucket 21, the actuating element 50 must be engaged to increase the speed of the engine.

Tilting the lever 58 side-to-side away from longitudinal axis 62, about axis 63, causes the angle of the wheels 24 to rotate about vertical axis 62 to steer the work vehicle 10. Tilting the lever 58 in a left direction about axis 62 causes the wheels 24 to rotate in a counter clockwise direction, as viewed from the operator's perspective. Similarly, tilting the lever 58 in a right direction about axis 62 may cause the wheels 24 to rotate in a clockwise direction.

The magnitude of the angle of tilt or deflection of the lever away from axis 62, about axis 63, in the side-to-side direction may be related to the rotation angle of the wheels 24. As the tilt angle of the lever 58 away from longitudinal axis 62, about axis 63, approaches a maximum position, the rotation angle of the wheels 24 in the associated direction approaches a maximum value. In this manner, motion of the lever 58 is related (i.e., proportional) to steering angle.

In particular applications, it may beneficial to invert the control function of the actuating element 50, whereby pushing up on the actuating element 50 causes the rpm of the engine to decrease and pushing down on the actuating element 50 causes the rpm of the engine to increase. This may be useful for loader arm, coupler, and drive train control and the like. In order to invert the control function of the actuating element 50, button 49 is provided proximate the actuating element 50. By depressing the button 49, the control function of the actuating element 50 is reversed.

In another embodiment, the button 49 may be used as a programmable throttle control mechanism or button to reset the throttle and the engine speed of the vehicle 10. In some applications, it may be beneficial to provide a button or other mechanism to allow for the throttle to be quickly and reliably returned to a programmed speed. This allows the operator to prevent stalling and the like in various circumstances. As the throttle is reset, the range of the actuating element 50 is also appropriately reset to control the newly established programmed speed of the engine, i.e., the rpm's of the engine. In addition, the button 49 may be programmable to allow the throttle reset position to be set for particular applications. As an example, the button 49 may be held in for a period of time as the speed of the engine is maintained at a constant to program the throttle to return to that selected speed when the button 49 is later depressed. In so doing, the button 49 is programmed to return to the throttle and the speed of the engine to the appropriate programmed speed for the conditions when the button 49 is depressed. As the throttle is reset, the range of the range of the actuating element 50 is also appropriately reset to control the newly established programmed speed of the engine.

The functions and configurations of the buttons 46, 48, 49 and the trigger 56 are provided for illustration purposes only. The control handle 42 may have other control elements such as buttons, switches, or triggers which control different aspects of the work vehicle 10 without departing from the scope of the invention. As an example, a small thumb joystick 60 may be provided on the handle to allow the operator to control the motion of the lift assembly or the like, as shown in FIG. 2b. The control elements are constructed and arranged so that they can be reached reliably with one or two digits of a hand of the operator resting on the gripping portion.

The positioning of the actuating element 50 on the control handle 42 eliminates the need for known mechanical hand levers or foot pedals used to control the speed of the engine. As the actuating element for changing the speed of the engine of the vehicle is conveniently movable by an operator's digit to a plurality of positions to effect the desired engine speed, the operator is not required to remove focus from the control handle 42. The operation of the work vehicle 10 is simplified, thereby minimizing operator error. Consequently, the use of the actuating element 50 enhances safety and reduces operator fatigue during operation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A steering, engine speed and implement control mechanism for operating a vehicle, the control mechanism comprising:

a control handle mounted on the vehicle, the control handle having a trigger and configured to deflect in a plurality of directions along more than one axis by movement of an operator's hand;

a steering direction of the vehicle related to manipulation of the trigger and a movement of the control handle about at least one axis, such that manipulation of the trigger moves the vehicle at least in the fore or aft direction, and left or right rotational movement of the control handle about a vertical axis moves the vehicle in a left or right rotational movement, respectively, an implement movement related to a movement of the control handle along more than one axis, such that movement of the control handle upward and downward along the vertical axis moves a lift assembly connected to the vehicle in an upward and downward direction, respectively, and deflection of at least a portion of the control handle along a longitudinal axis fore and aft moves a bucket connected to the lift assembly upward and downward, respectively;

an actuating element for changing the speed of the engine of the vehicle, attached to the control handle and conveniently movable by an operator's digit to a plurality of positions to effect the desired engine speed; and a control circuit operably connected between the actuating element and a throttle control mechanism, the control circuit having predetermined maximum and minimum engine speeds programmed therein, such that continued activation of the actuating element by the operator's digit does not cause the engine speed to increase or decrease beyond the maximum and minimum engine speed programmed therein.

2. The control mechanism of claim 1 wherein the control circuit receives input from the actuating element and sends appropriate output to the throttle control mechanism to control the speed of the engine.

3. The control mechanism of claim 2 wherein the actuating element is an electronic roller switch which is rotatable about an axis by movement of the operator's digit.

4. The control mechanism of claim 2 wherein the actuating element is a pair of push buttons.

5. The control mechanism of claim 2 wherein the actuating element is an electronic slider switch which is slidable by movement of the operator's digit.

6. The control mechanism of claim 2 wherein the actuating element is an potentiometer which is rotatable about an axis by movement of the operator's digit.

7. The control mechanism of claim 1 wherein the throttle control mechanism is programmable to allow the speed of the engine to be returned to a programmed speed and resets the actuating element consistent with the programmed speed, thereby allowing the operator to prevent stalling of the vehicle.

8. A steering, engine speed and implement control mechanism for operating a vehicle, the control mechanism comprising:

a control handle mounted on the vehicle, the control handle having a trigger and configured to deflect in a plurality of directions along more than one axis by movement of an operator's hand;

a steering direction of the vehicle related to manipulation of the trigger and a movement of the control handle about at least one axis, such that manipulation of the trigger moves the vehicle at least in the fore or aft direction, and left or right rotational movement of the control handle about a vertical axis moves the vehicle in a left or right rotational movement, respectively, an implement movement related to a movement of a thumb joystick on the control handle such that an operator's thumb on the thumb joystick moves the implement;

an actuating element for changing the speed of the engine of the vehicle, attached to the control handle and conveniently movable by an operator's digit to a plurality of positions to effect the desired engine speed; and a control circuit operably connected between the actuating element and a throttle control mechanism, the control circuit having predetermined maximum and minimum engine speeds programmed therein, such that continued activation of the actuating element by the operator's digit does not cause the engine speed to increase or decrease beyond the maximum and minimum engine speed programmed therein.

9. The control mechanism of claim 8 wherein the control circuit receives input from the actuating element and sends appropriate output to the throttle control device to control the speed of the engine.

10. The control mechanism of claim 8 wherein the actuating element is an electronic roller switch which is rotatable about an axis by movement of the operator's digit.

11. The control mechanism of claim 8 wherein the actuating element is an electronic slider switch which is slidable by movement of the operator's digit.

12. The control mechanism of claim 8 wherein a the throttle control mechanism is programmable to allow the speed of the engine to be returned to a programmed speed and resets the actuating element consistent with the programmed speed, thereby allowing the operator to prevent stalling of the vehicle.

* * * * *